Sept. 18, 1962  R. E. BUCK  3,054,621

RESILIENT AUXILIARY CHUCK JAW

Filed June 30, 1961

INVENTOR.
RUSSELL E. BUCK
BY
Woodhams, Blanchard & Flynn
ATTORNEYS

United States Patent Office 3,054,621
Patented Sept. 18, 1962

3,054,621
RESILIENT AUXILIARY CHUCK JAW
Russell E. Buck, Scotts, Mich., assignor to Buck Tool Company, Kalamazoo, Mich., a corporation of Michigan
Filed June 30, 1961, Ser. No. 121,042
9 Claims. (Cl. 279—110)

This invention relates to work holding devices and particularly to a device for use in conjunction with the jaws of a standard power chuck for insuring the seating of the work solidly against the faces of the chuck jaws.

In the use of power chucks for high speed production operations, the workpieces are normally inserted and removed manually. Thus, to obtain accurate results, it is necessary that the operator introduce the work to the chuck jaws with sufficient care that the workpiece rests solidly against the jaws' faces at the moment of closure of said jaws. Where the workman becomes careless and releases the workpiece before the actual gripping thereof by the jaws, it sometimes happens that the workpiece is not placed solidly against the face of one or more of the jaws and it may thus be displaced slightly from its intended position and the resulting work thereon will be correspondingly inaccurate.

Accordingly, the objects of the invention are:

(1) To provide a device for use with the jaws of a power chuck to insure that a workpiece will be bottomed solidly against the faces of the chuck jaws when said jaws close.

(2) To provide a device as aforesaid which will grasp the work a sufficient distance away from its intended position that the workman needs merely to place the workpiece in approximately its intended position and the apparatus will complete the locating thereof.

(3) To provide a device as aforesaid which can be as desired either made integral with the chuck jaw or applied thereto as a separate attachment.

(4) To provide apparatus as aforesaid which will be applicable to a wide variety of different sizes, makes and styles of jaws.

(5) To provide apparatus as aforesaid which is exceedingly simple and hence correspondingly inexpensive in both its original construction, its installation onto a chuck jaw (where it is not made integral therewith) and in its maintenance.

(6) To provide a device as aforesaid which will require no special attention on the part of the operator and which will require no new or different manipulations on the part of the operator but which will instead permit the operator to supply workpieces to the chuck jaws and to remove finished workpieces therefrom in the same manner as he carries out these operations with conventional chuck jaws.

Other objects and purposes of the invention will be apparent to persons acquainted with apparatus of this general sort upon reading the following disclosure in connection with the accompanying drawings.

In the drawings:

FIGURE 6 is a section taken on the line VI—VI of FIGURE 5, said line for reference purposes also appearing in FIGURE 2.

*General Description*

In general, the invention consists of providing an angularly positioned preliminary gripping device on each chuck jaw, which devices are so mounted that upon closure of the chuck jaws, these devices will engage the work before the chuck jaws engage the work. Such preliminary gripping devices are further so mounted that movement thereof radially outwardly with respect to the chuck also effects movement thereof toward the jaw faces. Thus, upon placement of a workpiece within the chuck jaws, closure of said jaws will (1) effect preliminary engagement of the workpiece by such preliminary gripping devices then (2) as the jaws continue to close and before the main jaws actually engage the work, the preliminary engaging devices are moved radially outwardly with respect to the chuck jaws and, (3) as the said devices so move, they move rearwardly toward the faces of the chuck jaws and thereby carry the workpiece into solid contact therewith.

*Detailed Description*

Figure 1:
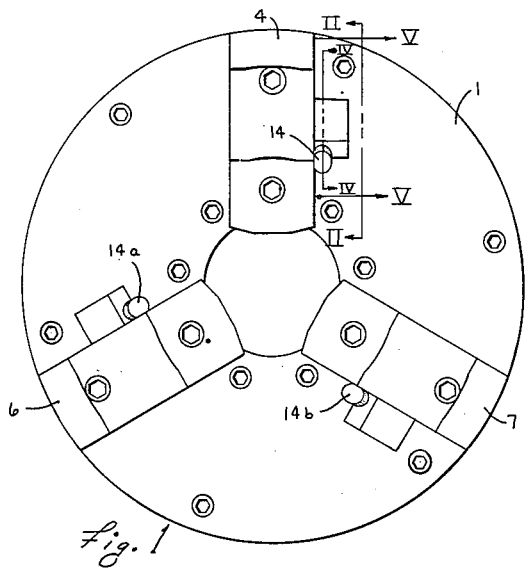
FIGURE 1 represents a face view of a standard power chuck with devices of the invention attached respectively to each jaw thereof as separate attachments.

Referring now to the drawings, there is shown in FIGURE 1 a front view of a standard power chuck with a preferred embodiment of the invention applied on the side of each of its jaws.

The chuck body 1 is of conventional construction and supports a plurality, here three, of radially movable jaw bases of which two are schematically indicated at 2 and 3. Conventional means, not shown, are provided for effecting radial movement of said jaw bases under power in a known manner. Conventional jaws are provided on said jaw bases, said jaws being indicated at 4, 6 and 7. While the invention can be used with both internal and external jaws, and jaws of many different specific types, it is sufficient to illustrate same with jaws for externally engaging a workpiece and accordingly the jaws so selected to illustrate the invention are of this type.

Figure 4:
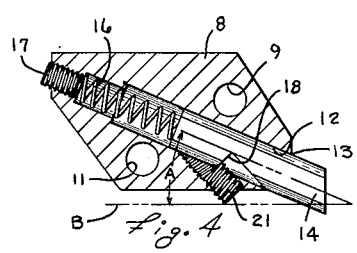
FIGURE 4 is a section taken on the line IV—IV of FIGURE 1.
Figure 5:
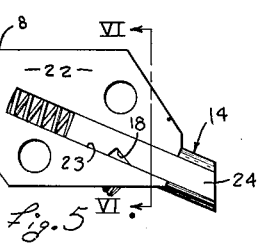
FIGURE 5 is a side view of a device embodying the invention.

The device itself is illustrated in FIGURES 4, 5 and 6. It consists of a small body part block 8 having openings 9 and 11 therethrough for the reception of screws by which said block is attached to the desired part of the chuck jaw, the precise location of which is brought out further hereinafter. An opening 12 is positioned within the body part block 8 and exits therefrom substantially at the corner thereof as indicated at 13. The plunger 14 is received within said opening and is backed by a spring 16 whose tension is determined by an adjusting screw 17. The forward travel of the plunger in response to said spring 16 is limited by any convenient means which in this embodiment comprises a notch 18 providing a shoulder against which a second adjusting screw 21 is positioned.

The plunger 14 is preferably arranged against rotation and this can be accomplished in several ways. In the present embodiment, this is accomplished inexpensively by causing the opening 12 to intersect the surface 22 of the bodypart block 8. The portion of the plunger 14, which would otherwise project through the elongated opening 23 thereby created, is cut off to provide a flat area 24. Said flat area bears against the adjacent surface of the chuck jaw (the jaw 4 in FIGURE 6) and the plunger is thereby solidly held against rotation.

The angle "A" formed between the axis of the plunger 14 and the line "B" which is perpendicular to the direction of travel "C" of the chuck jaws during their closing operation (line "B" thereby being usually but not necessarily parallel with the axis of the chuck), is at least 17½ degrees of angle and is preferably approximately 25 or 30 degrees. A low angle of the order of 20 degrees requires too much force to move the plunger back into said body part block with both the possibility of bending said plunger and/or undesirably marking the outside surface of the workpiece. On the other hand, a very high value for angle "B," such as of the order of 60 degrees has the advantage of engaging the workpiece very lightly, which would permit the use of this device with relatively soft materials, such as soft metals or plastics, but it has the disadvantage that it takes a relatively long radial movement of the chuck jaws to effect appreciable axial movement of the workpiece and thus much of the effectiveness of the seating device is lost. For most convenient operation with steel workpieces and without requiring excessive radial movement of the chuck jaws, an angle of from about 25 degrees to about 40 degrees appears to be the optimum.

*Operation*

Figures 2, 3:
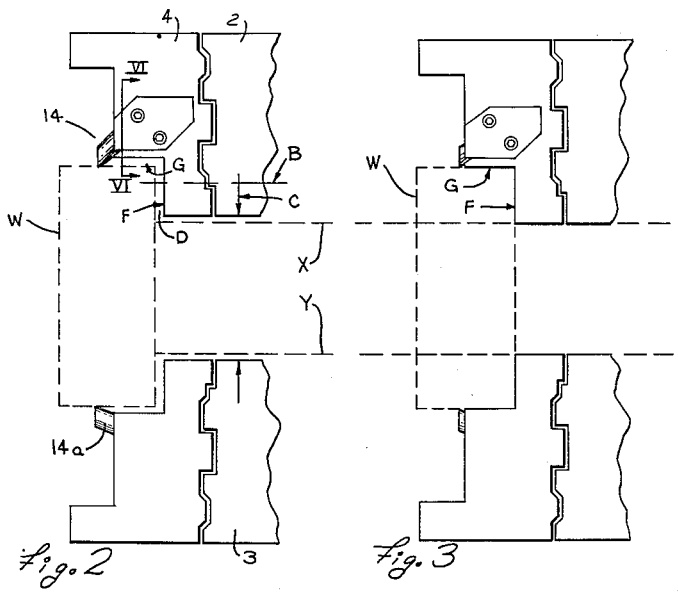
FIGURE 2 is a schematic representation of a pair of jaws, the base of same and the devices of the invention affixed to the jaws, the view of one of said jaws being taken approximately from the line II—II of FIGURE 1 and illustrating the introduction of a workpiece to the chuck jaws.
FIGURE 3 is a view similar to FIGURE 2 with the jaws in closed position and the workpiece solidly bottomed against the faces of the chuck jaws.

The operation of the device is illustrated in FIGURES 2 and 3. With the plungers 14, 14a and 14b projecting in the normal manner, said plungers constitute preliminary gripping devices and are illustrated in FIGURE 2 with the jaws in open position. The workpiece "W" is inserted between the jaws and between the preliminary gripping devices provided by said plungers. As the jaws close the preliminary gripping devices engage the workpiece before same is engaged by the jaws and for the purpose of illustration it will be assumed that the workpiece was not placed by the workman against the faces "F" of the jaws but instead said workpiece was spaced a short distance "D" therefrom.

As the jaws continue to close the substantial incompressibility of the workpiece forces the plungers radially outwardly with respect to the jaws upon which they are respectively mounted and thereby moves them axially rightwardly as appearing in FIGURES 2 and 3. Inasmuch as the workpiece is supported on and by the preliminary gripping devices, and not yet by the jaws, said workpiece will be carried rightwardly until it bottoms against the faces "F" of said jaws. As soon as said workpiece has so bottomed against one or more of said faces, the plunger associated with the jaw against which said workpiece has bottomed will merely slip along the external surface of the workpiece if such bottoming occurs, as it normally does, before the plunger has moved sufficiently in a radially outward direction that the gripping surface "G" of the jaws engage the workpiece. Thus, even though the workpiece is placed into the jaws in a cocked position, it will be by the device of the invention solidly bottomed equally against each of the faces of the jaws in proper position for whatever subsequent operation is to be performed. The reference lines "X" and "Y" in both FIGURE 2 and FIGURE 3 illustrate the relative positions of the innermost parts of the chuck jaws and jaw bases at the end of the jaw closing operation.

When such operation is completed, the jaws open and the workpiece is removed in the usual manner. In so doing, however, the plungers will move the workpiece slightly away from the faces "F" of the jaws and thereby somewhat facilitate the removal of the workpiece by the workman from the jaws.

The apparatus is now in position to receive the next workpiece and to repeat the cycle.

*Modification*

Figure 9:
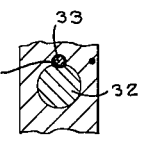
FIGURE 9 is a section view on the line IX—IX of FIGURE 8.
Figure 7:
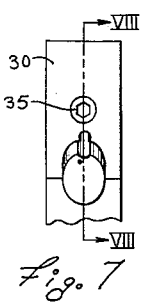
FIGURE 7 is an end view of a jaw having a gripping device built therein.
Figure 8:
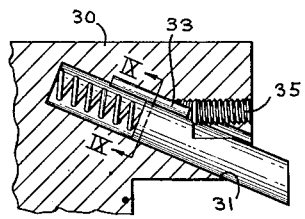
FIGURE 8 is a section view on the line VIII—VIII of FIGURE 7.

In FIGURES 7, 8 and 9 there is shown a modification wherein the plunger is placed within the body 30 of a chuck jaw. Here the opening for the plunger appears at 31 and is located within the jaw itself. The plunger 32 is prevented from rotation by the smooth pin 33 which is received into an opening of more than 180 degrees but still intersecting the plunger opening 31 so that the pin may project therethrough. The plunger has a groove 34 along one side engaging and being guided by said pin. The plunger is provided with a back-up spring, here not adjustable, and a limiting screw 35 in the same general manner as above described for the form of FIGURES 1 through 6. The operation of this form is the same as above described for the form of FIGURES 1 through 6 and needs no repetition.

Although particular preferred embodiments of the invention have been described above in detail for illustrative purposes, it will be recognized that variations or modifications of such disclosure, which lie within the scope of the appended claims, are fully contemplated.

What is claimed is:

1. A work placement device for use with a chuck having jaws with seating surfaces thereon, comprising in combination:

preliminary gripping devices comprising retractable means associated with said chuck jaws in a manner to engage the workpieces during the closing operation of said chuck jaws and to do so before said chuck jaws engage the workpiece, said retractable means also extending away from said seating surfaces;

whereby said retractable means will engage a workpiece prior to the engagement thereof by said chuck jaws and as said jaws close said retractable means will be pushed toward said chuck jaws and simultaneously carry the workpiece toward said seating surfaces.

2. The device defined in claim 1 wherein said retractable means each includes a plunger and means positioning same angularly with respect to the direction of movement of said chuck jaws as same close to engage a workpiece and wherein said retractable means extend from said chuck jaw in a direction having a component thereof directed in said jaw closing direction.

3. The device defined in claim 1 wherein said retractable means each consists of a plunger mounted on a chuck jaw for movement in a direction having at least one component parallel with the direction of movement of said jaws when same are moving in a closing direction and having at least another component directed substantially perpendicularly away from said seating surfaces, and means normally urging said plunger in said last-named direction.

4. The device defined in claim 1 including also adjustable means limiting the extent of movement of said retractable means.

5. A device for attachment to a jaw of a chuck, said jaw having a seating surface and also a work gripping surface, said device comprising:

a body part block adapted for attachment as aforesaid, and having an angularly positioned opening therein, the axis of said opening being aligned, when said block is attached in operative position on said chuck jaw, in a direction having components both (1) parallel to the direction of movement of said chuck jaw when same is moving in a closing direction and (2) perpendicular to said seating surface;

a plunger within said opening;

means urging said plunger in a direction away from the work gripping surface of said chuck jaw and away from said seating surface and means limiting the maximum distance that the plunger can move in response to said urging means.

6. The device defined in claim 5 wherein said urging means comprises resilient means.

7. The device defined in claim 5 wherein said limiting means is adjustable.

8. The device defined in claim 5 including means to prevent rotation of said plunger when same grips a workpiece.

9. The device defined in claim 5 wherein said opening intersects that side of said body part block which is intended to lie against a chuck jaw, and said plunger having a portion thereof flattened so that same lies flush with that side of said body part block with which said opening intersects, whereby said flat portion of said plunger will lie against the adjacent side of said chuck jaw and be prevented from rotating when same engages a workpiece.

References Cited in the file of this patent

UNITED STATES PATENTS

| | | |
|---|---|---|
| 1,799,019 | Mischler | Mar. 31, 1931 |
| 2,158,490 | Webster | May 16, 1939 |
| 2,473,935 | Ashton | June 21, 1949 |